3,050,419
PROCESS FOR FIXING AMINOPLASTS IN THE WET STATE ON CELLULOSIC FIBROUS MATERIALS

Andreas Ruperti, Arlesheim, Switzerland, assignor to Ciba Limited, Basel, Switzerland
No Drawing. Filed Apr. 29, 1957, Ser. No. 655,515
Claims priority, application Switzerland May 8, 1956
2 Claims. (Cl. 117—138.5)

For the improvement of textiles and other fibrous materials with aminoplasts it is customary to impregnate the material with an aqueous solution of an amine-aldehyde condensation product and then dry the material. Since drying alone is generally insufficient to produce the desired effect, the material is subsequently subjected to a raised temperature in order to harden the condensation product. By hardening in the dry state there are formed water-insoluble products and at the same time the properties of the impregnated fibers undergo substantial change. The reduction in the capacity of the fibers for absorbing water and in their swelling capacity results in better retention in shape, crease resistance and other improvements of the material. At the same time the capacity of the fibers for being dyed with direct dyestuffs is reduced or completely eliminated. The mechanical properties, such as tensile strength in the wet and dry state, are more or less strongly impaired, especially in the case of materials of natural cellulose fibers.

Instead of hardening the aminoplast in the dry state, it can be converted on the fiber into the insoluble state without previous drying and without completely removing the water derived from the impregnating solution, and retained by the fiber, before completion of the condensation of the resin, so that the condensation takes place in the presence af water derived from the impregnating solution. In this method of fixing, which is called wet fixing in order to distinguish it from dry hardening, the reaction takes quite a different course. The reactions causing reduction in swelling capacity are suppressed by the presence of water and the aminoplast becomes insoluble without the properties of the fiber being changed in the way they are by dry hardening. The capacity of the fiber for being dyed with direct dyestuffs is not changed, the mechanical properties of the fiber are not impaired, the fibers are protected against the attack of microorganisms, and yet such improvements as lead to a reduction in the capacity for absorbing water or in the swelling capacity are still achieved. Accordingly, fundamental differences both with regard to the course of reaction and the effects produced occur depending on whether dry hardening or wet fixing is used.

Both dry hardening and wet fixing proceed more rapidly the lower the pH value, so that in order to accelerate the condensation an acid or potentially acid substance is used as catalyst.

Under acid conditions the aminoplast undergoes slow condensation in the impregnating solution, so that the composition of the solution does not remain constant. It is therefore customary to use a potentially acid salt as catalyst, which produces an acid reaction during the hardening by reaction with formaldehyde. However, the same reaction proceeds, although more slowly, in the impregnating solution so that the latter retains its usable condition for a relatively short time. The most stable baths are obtained by using catalysts which are neither acid nor react with formaldehyde to form substances of acid reaction, and which produce an acid reaction only during the concentration which occurs during drying, either due to the formation of strong complex acid or due to thermal decomposition. The latter type of catalysts, which can be successfully used in the ordinary dry hardening, is hardly suitable for wet fixing in the presence of water.

Since in almost all cases the addition of a catalyst leads to a very undesirable reduction in the stability of the impregnating solution, it is usually recommended to add the catalyst immediately before the solution is to be used.

Hitherto dry hardening has chiefly been used in the textile industry. Dressings of artificial resin have been applied to fabrics almost exclusively by impregnation on a foulard. For this purpose a bath stability of a few hours suffices, because the impregnating bath is rapidly consumed or is continually renewed. Recently the advantages of wet fixing having been recognized for certain purposes. Thus, for example, cotton yarn to be used for the manufacture of fishing nets has been given a rot-proof dressing with melamine resin by wet fixing, for which purpose dry hardening is unsuitable. In contradistinction to the impregnation of fabrics followed by dry hardening, it is desirable to carry out wet fixing in many cases with yarn or loose fibers in dyeing apparatus and at a very high liquor ratio. Such applications in long liquors can only be carried out economically if the impregnating baths are sufficiently stable and can be repeatedly used over a long period. The decisive importance of bath stability necessitates the use for wet fixing of catalysts which fulfill requirements that have not to be taken into account in the case of catalysts used for dry hardening. Only in exceptional cases can acid baths be used for wet fixing, owing to the continual change in the impregnating solution. It is possible to use potentially acid salts as catalysts, which depend for their action upon reaction with formaldehyde, but these catalysts also are hardly suitable for operation in standing baths which involve keeping the impregnating solution for more than one working day. The catalysts of the third group mentioned above, which depend for their action on the formation of complex acids during drying or upon thermal decomposition of the anhydrous catalyst during dry hardening, are by their very nature and function unsuitable for wet fixing where there is no previous drying. Accordingly, new principles must be sought which lie outside those hitherto known for dry hardening.

The present invention is based on the observation that substances which are stable in the anhydrous state, do not themselves produce an acid reaction when added to the resin solution, and change slowly in aqueous solution at room temperature, but are hydrolyzed by water at a raised temperature with the splitting off of acid or a substance of acid reaction, fulfil to a very great extent the requirements for catalysts for wet fixing.

Accordingly, the present invention provides a process for fixing aminoplasts in the wet state on fibrous materials at a raised temperature, wherein there is used as catalyst a compound having the properties given above. Especially suitable are esters of polyhydric alcohols or of polybasic acids, of which the solubility in water is sufficient to enable them to dissolve at the required concentration in the aminoplast bath. As such esters there may be mentioned, for example, diacetin, monochlorhydrin, dichlorhydrin, glycol diacetate, glycol methyl ether acetate, glycol ethyl ether acetate and diethyl tartrate. These catalysts are generally not suitable for dry hardening, because their action depends on their undergoing hydrolysis by the water present during fixing at a raised temperature, and they are unable to produce the necessary lowering in pH value during dry hardening.

The term "hardenable aminoplasts," which products can be used in the impregnating process, is used herein to include hardenable carbamide or melamine resins, which are either soluble in water or of limited solubility in water, and may be etherified, and which are obtainable in known manner by condensing formaldehyde with such compounds as, for example, urea, thiourea, cyanamide, dicyandiamide, biguanide, melamine, formoguanamine, acetoguanamine or the like, and also mixtures of two or more of these compounds, and also their alkyl- or acyl-compounds. Especially good results are obtained with water-soluble condensation products of melamine and formaldehyde.

As condensation products of limited solubility in water there are to be understood those colloidal intermediate stages of condensation which result immediately the condensation is continued beyond the crystalline methylol stage. Accordingly, they possess the characteristic of being precipitated from concentrated aqueous solutions by the addition of water.

The condensation products of unlimited solubility in water are used in the form of aqueous solutions, and those of limited solubility in water are advantageously used in the form of dispersions.

The impregnating bath advantageously contains about 5–15% of the aminoplast either in solution or in dispersion. The impregnation is advantageously carried out by applying the aminoplast to the fiber in a proportion amounting to about 4–10% on the weight of the fiber, but higher or lower proportions may be applied. Generally speaking, the proportion of catalyst is 5–10% on the weight of the aminoplast used.

The impregnating solution, when ready for use and containing the catalyst, is advantageously prepared so as to have a weakly alkaline pH value, and for this purpose no special addition is normally required when an aminoplast of weakly alkaline reaction and a neutral catalyst are used. At such a pH value the baths can be kept for many days. As, however, even at room temperature slow hydrolysis of the catalyst occurs in aqueous solution, the alkalinity of the bath gradually diminishes in the course of time. It is therefore of advantage to take care that the pH value does not fall below 7.2, because at this point, which is still on the alkaline side, the stability of the bath rapidly diminishes so that it becomes unusable in a short time. By the addition of a small amount of sodium carbonate or other alkaline compound the reduction in pH value which occurs after several hours or days can easily be corrected. At the same time, however, it is necessary to add a quantity of fresh catalyst equivalent to the addition of alkali in order to maintain the full activity of the catalyst. In this manner an impregnating bath can be used for a very long time. Furthermore, concentrated treatment baths may be used, such as are customary.

The impregnation may be carried out by the customary methods and with the usual types of apparatus.

The fixation of the aminoplast is advantageously carried out entirely without drying the impregnated fibrous material. Partial drying of the material before or during the fixation is permissible, provided that the partial drying is uniform and not accompanied by harmful migration of the condensation product. The simplest way of carrying out the process is to squeeze or centrifuge the fibrous material impregnated with a solution or emulsion, that is to say, to remove the excess of bath liquor mechanically, without drying the material, and then to maintain the material at a raised temperature for a prolonged period during which premature drying is prevented. The period for which it is necessary to maintain the material at a raised temperature is dependent, on the one hand, on the nature of the aminoplast and reaction accelerator used and, on the other, on the temperature. The temperature is so chosen that the catalyst undergoes hydrolysis sufficiently rapidly. It is of advantage to maintain the impregnated fibrous material in a closed vessel, whereby premature drying is automatically prevented. It is also very advantageous to use direct steam, if desired, under pressure, as the source of heat.

The impregnation of the cellulose fibrous material with the aminoplast followed by wet fixing can be carried out at any desired stage in the manufacture of the fibrous material, for example, loose fibrous material, yarn, fabric or knitted goods. The cellulose fibers to be treated by the process of this invention may be composed of natural, mercerized or regenerated cellulose.

The following examples illustrate the invention:

*Example 1*

Three hanks of cotton yarn weighing 10 grams each were impregnated with a solution containing, per liter, 100 grams of a melamine-formaldehyde condensation product of unlimited solubility in water obtained from one molecular proportion of melamine and about 2 molecular proportions of formaldehyde, and 5 grams of dichlorhydrin, and each hank was centrifuged in a perforated metal beaker in a laboratory centrifuge. One of the hanks was then dried and subjected to hardening for 6 minutes at 140° C. (hank No. 1). The other two hanks were subjected to wet fixing without being dried, hank No. 2 being maintained overnight in a closed glass tube at 80° C. in a thermostatic cabinet, and hank No. 3 being heated for one hour at 130° C. in an autoclave. In order to prevent local drying at the places of contact with the vessel walls, the hanks were protected during the wet fixing by winding round them strips of wet material that had been impregnated together with the hanks.

The degree of fixation of resin was determined by analysis for nitrogen before and after boiling the treated material in distilled water for ½ hour. The values for nitrogen and the amounts of resin fixed fast to boiling (calculated from the nitrogen values), are given in the following table:

| Hank No. | Percent Nitrogen on the fibre | | Amount of resin fixed fast to boiling, percent |
|---|---|---|---|
| | before drying | after boiling ½ hour | |
| 1 | 5.3 | 0.1 | 2 |
| 2 | 5.0 | 4.9 | 98 |
| 3 | 4.5 | 4.5 | 100 |

By using monochlorhydrin, diacetin, glycol ethyl ether acetate or glycol methyl ether acetate, instead of dichlorhydrin, there are obtained by the same procedure entirely analogous results. In all cases as the result of wet fixing the amount of resin fixed fast to boiling exceeded 90%, whereas in dry hardening practically no resin was fixed fast to boiling.

In order to test bath stability somewhat concentrated solutions containing, per liter, 120 grams of the same melamine-formaldehyde condensation product and 6 grams of the aforesaid catalysts, were allowed to stand at room temperature for a long time. The change in hydrogen-ion concentration of the solutions containing catalyst was observed by means of the ionoscope of the Swiss Vaccination and Serum Institute until the original pH value of 7.8 to 8.0 had fallen to 7.2. This is the critical point at which it is necessary to add an alkaline substance, otherwise the properties of the bath change rapidly, which becomes evident by the solution gradually becoming turbid and then flocculating or gelatinising. The bath underwent no visible change until the critical pH of 7.2 had been reached in the case of mono- and di-chlorhydrin in 3 days, diacetin in 4 days and in the case of the other two catalysts in 5 days.

*Example 2*

To an aqueous solution containing, per liter, 110 grams of a melamine-formaldehyde condensation product of unlimited solubility in water obtained from 1 molecular proportion of melamine and about 2 molecular proportions of formaldehyde, were added 5.5 grams of diacetin per liter as catalyst and 1 gram of a non-ionic wetting agent per liter. The solution was used to impart a rot-resistant dressing to cotton yarn, which was impregnated in a dyeing apparatus in the form of cross-wound bobbins, then centrifuged and, without being dried, subjected to wet fixing by treatment with steam at 130° C. for 1½ hours in a pressure boiler.

By the subsequent addition of a solution containing, per liter, 135 grams of the same melamine-formaldehyde condensation product, 5.5 grams of diacetin and 1 gram of wetting agent, the consumption of impregnating liquor and the fall in concentration due to a certain substantivity were compensated, and the impregnating solution was repeatedly used for treating further quantities of yarn. At the end of the working day the impregnating solution was placed in a storage container and stabilized by the addition of 3.3 grams of sodium carbonate per liter. When the impregnations were repeated a few days later the same impregnating solution was used, after adding 5.5 grams of fresh diacetin, per liter, thereof.

All the impregnations were satisfactorily fixed when subjected to the boiling test, so that the rot-resistant dressing was completely water-resistant.

What is claimed is:

1. In a process for imparting to cellulosic fibrous material a water resistant impregnation protecting such material from attack by micro-organisms, without substantial change in the tensile strength of the said material, by treating it with an aqueous impregnating liquid of an aminoplast which contains a hardening catalyst, wherein after impregnating the material and removing mechanically the excess of impregnating liquid the aminoplast is hardened in and upon the fiber into the water-insoluble condition, the improvement consisting of heating the impregnated material to effect said hardening with retention of a substantial amount of the water of the impregnating liquid until the resin condensation is completed so that the condensation into the water-insoluble state is actually conducted in the presence of water originating from the impregnating liquid, the said hardening catalyst being a compound selected from the group consisting of diacetin, monochlorhydrin, dichlorhydrin, glycol diacetate, glycol methyl ether acetate, glycol ethyl ether acetate and diethyl tartrate.

2. In a process for imparting to cellulosic fibrous material a water resistant impregnation protecting such material from attack by micro-organisms, without substantial change in the tensile strength of the said material, by treating it with an aqueous impregnating liquid of an aminoplast which contains a hardening catalyst, wherein after impregnating the material and removing mechanically the excess of impregnating liquid the aminoplast is hardened in and upon the fiber into the water-insoluble condition, the improvement consisting of heating the impregnated material to effect said hardening with retention of a substantial amount of the water of the impregnating liquid until the resin condensation is completed, so that the condensation into the water-insoluble state is actually conducted in the presence of water originating from the impregnating liquid, the said hardening catalyst being diacetin.

References Cited in the file of this patent

UNITED STATES PATENTS

| | | |
|---|---|---|
| 2,417,014 | Pollard | Mar. 4, 1947 |
| 2,484,598 | Weisberg et al. | Oct. 11, 1949 |
| 2,555,277 | Roger | May 29, 1951 |
| 2,559,349 | Detwiler | July 3, 1951 |
| 2,709,141 | Burks | May 24, 1955 |
| 2,762,719 | Kleiner | Sept. 11, 1956 |
| 2,763,574 | Ruperti | Sept. 18, 1956 |
| 2,819,179 | Barnard | Jan. 7, 1958 |
| 2,859,136 | Marsh et al. | Nov. 4, 1958 |

FOREIGN PATENTS

| | | |
|---|---|---|
| 526,449 | Canada | June 19, 1956 |